(12) United States Patent  (10) Patent No.: US 7,374,208 B2
Yamamoto et al.  (45) Date of Patent: May 20, 2008

(54) WORKING MACHINE

(75) Inventors: Keiji Yamamoto, Hiroshima (JP);
Yuichi Hoshino, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 242 days.

(21) Appl. No.: 10/773,171

(22) Filed: Feb. 9, 2004

(65) Prior Publication Data

US 2004/0181977 A1    Sep. 23, 2004

(30) Foreign Application Priority Data

Mar. 18, 2003 (JP) ............................. 2003-073826
Mar. 18, 2003 (JP) ............................. 2003-073827
Mar. 18, 2003 (JP) ............................. 2003-073828

(51) Int. Cl.
*B60P 3/24* (2006.01)
*B60K 26/00* (2006.01)
*B62D 33/63* (2006.01)

(52) U.S. Cl. ..................... 280/834; 180/327; 180/329
(58) Field of Classification Search ........ 280/830–834, 280/839; 180/327, 329
See application file for complete search history.

(56) References Cited

U.S. PATENT DOCUMENTS

| 4,411,441 | A |   | 10/1983 | Marcheix et al. |
| 5,002,325 | A | * | 3/1991 | Fought et al. ............. 296/37.14 |
| 5,711,095 | A | * | 1/1998 | Oda et al. .................... 37/410 |
| 5,715,615 | A | * | 2/1998 | Murakami et al. ........... 37/379 |
| 6,170,180 | B1 |  | 1/2001 | Schaeff |
| 6,540,036 | B1 | * | 4/2003 | Sugano ....................... 180/68.1 |
| 6,678,972 | B2 | * | 1/2004 | Naruse et al. ................ 37/466 |
| 6,715,195 | B2 | * | 4/2004 | Erickson ...................... 29/434 |
| 6,772,544 | B2 | * | 8/2004 | Takemura et al. ............. 37/347 |
| 6,905,139 | B2 | * | 6/2005 | Akahane et al. ............. 280/831 |
| 2003/0006349 | A1 | * | 1/2003 | Sadowski et al. ........... 248/154 |

FOREIGN PATENT DOCUMENTS

JP    61-139573    6/1986

(Continued)

OTHER PUBLICATIONS

Patent Abstracts of Japan, JP 01-115726, May 9, 1989.

(Continued)

*Primary Examiner*—Lesley D. Morris
*Assistant Examiner*—Marc A Scharich
(74) *Attorney, Agent, or Firm*—Oblon, Spivak, McClelland, Maier & Neustadt, P.C.

(57) ABSTRACT

In the working machine of the present invention, a tank mounting portion is provided in an upper rotating body, a fuel tank is mounted removably in the tank mounting portion, and engaging portions are formed respectively on both body side of the working machine and the tank side so as to be engaged with each other when the tank is set in the tank mounting portion, thereby preventing in this engaged state the tank from moving in vertical directions and in substantially horizontal directions other than a removable direction of the tank, while a fuel tank dislodgment preventing means is provided to prevent movement in the removable direction of the tank when set in the tank mounting portion. In this working machine, the tank mounting structure can be reduced in both size and weight.

18 Claims, 12 Drawing Sheets

FOREIGN PATENT DOCUMENTS

| | | |
|---|---|---|
| JP | 63-255123 | 10/1988 |
| JP | 9-76774 | 3/1997 |
| JP | 9-184167 | 7/1997 |
| JP | 2001-90112 | 4/2001 |
| JP | 2001-288778 | 10/2001 |

OTHER PUBLICATIONS

Patent Abstracts of Japan, JP 2003-278184, Oct. 2, 2003.
Patent Abstracts of Japan, JP 2000-336693, Dec. 5, 2000.
Patent Abstacts of Japan, JP 11-022574, Jan. 26, 1999.
Patent Abstracts of Japan, JP 10-030255, Feb. 3, 1998.

* cited by examiner

WORKING MACHINE

BACKGROUND OF THE INVENTION

1. Field of the Invention

The present invention relates to a working machine having a tank mounting portion.

2. Description of the Related Art

In an upper rotating body of a hydraulic excavator as a working machine, various devices, including an engine and a fuel tank, are mounted to an upper frame which is a base of the upper rotating body. For example, in Japanese Patent Laid Open Publication No. 2001-90112, there is described a tank mounting structure wherein a longitudinal rib is formed so as to cross a partition wall for partition from an engine, a fuel tank is brought into abutment against both partition wall and longitudinal rib, and a clamping band is applied longitudinally to outside faces of the fuel tank to mount the tank.

However, not only such a large-sized component as the clamping band, as well as band fixing bolts, are needed, but also an independent mounting means for mounting a battery is needed because the battery is disposed at a position different from the position of the tank. Consequently, the number of parts is larger and the cost is higher.

Besides, it is necessary that the whole of the mounting structure have a strength high enough to bear the clamping force of the clamping band. As a result, the whole of the mounting structure not only becomes more and more expensive but also becomes larger in both size and weight. Therefore, particularly in a small-sized excavator having a small-sized upper frame, it has so far been difficult to ensure a mounting space for the various devices.

SUMMARY OF THE INVENTION

It is an object of the present invention to provide a working machine provided with a tank mounting structure capable of being simplified in structure and reduced in size.

The working machine according to the present invention has the following basic construction.

The working machine according to the present invention has a fuel tank which is mounted removably in a tank mounting portion within a machine body of the machine so that the tank is removable in a generally horizontal direction as its removable direction out of the machine body. Further, in the working machine according to the present invention, there are provided a battery mounted removably on the machine body and engaging portions formed on both machine body and fuel tank. The engaging portions are put in engagement with each other in an engaged state when the fuel tank is set in the tank mounting portion. In this engaged state, movements of the fuel tank in vertical directions and in generally horizontal directions other than the removable direction of the fuel tank can be inhibited. In addition, there is provided a fuel tank dislodgment preventing means for preventing movement of the tank in the removable direction when the fuel tank is set in the tank mounting portion.

In this case, the engaging portions are engaged with each other when the fuel tank is set in the tank mounting portion, and by virtue of an engaging action in the engaged portions, it is possible to inhibit movements of the fuel tank in vertical directions and in at least horizontal directions other than the tank removable direction. Further, the tank can be securely fixed to the tank mounting portion by the tank dislodgment preventing means.

Thus, all that is required for forming the fuel tank mounting portion is only forming engaging portions in both fuel tank and tank mounting portion and adding tank dislodgment preventing means. Consequently, not only such a large-sized clamping band as in the related art is no longer necessary, but also a simple structure which permits only a literal prevention of tank dislodgment suffices as tank dislodgment preventing means. As a result, it is possible to simplify the whole of the tank mounting structure and attain the reduction in size and cost thereof. Besides, mounting work of the tank becomes easier because it is no longer required to perform the troublesome clamping band attaching and detaching operation.

The working machine according to the present invention may have the following basic construction.

The working machine according to the present invention is provided with a lower traveling body and an upper rotating body mounted rotatably on the lower traveling body. On the other hand, an upper fame which constitutes a base of the upper rotating body has a bottom plate connected rotatably to the lower traveling body through a swing bearing. The working machine is further provided with a working device, the working device being attached to the upper rotating body and comprising a boom, an arm and a bucket, a main frame disposed on the bottom plate and constituted by a longitudinal wall extending backward from a mounting portion for mounting the working device, and a fuel tank installed on the bottom plate in contact with the longitudinal wall of the main frame. An upper end portion of the fuel tank is formed with a hollow projecting portion which projects sideways beyond the longitudinal wall.

In this case, since the projecting portion projecting sideways beyond the longitudinal wall of the main frame is formed at the upper end of the fuel tank, it is possible to increase the tank capacity correspondingly to the projecting portion.

Therefore, particularly in a working machine whose tank capacity is limited due to a limited space, it is possible to prolong the time of continuous operation, hence reduce the number of times of oil supply, and thereby improve the working efficiency.

DESCRIPTION OF THE PREFERRED EMBODIMENTS

Figure 14:
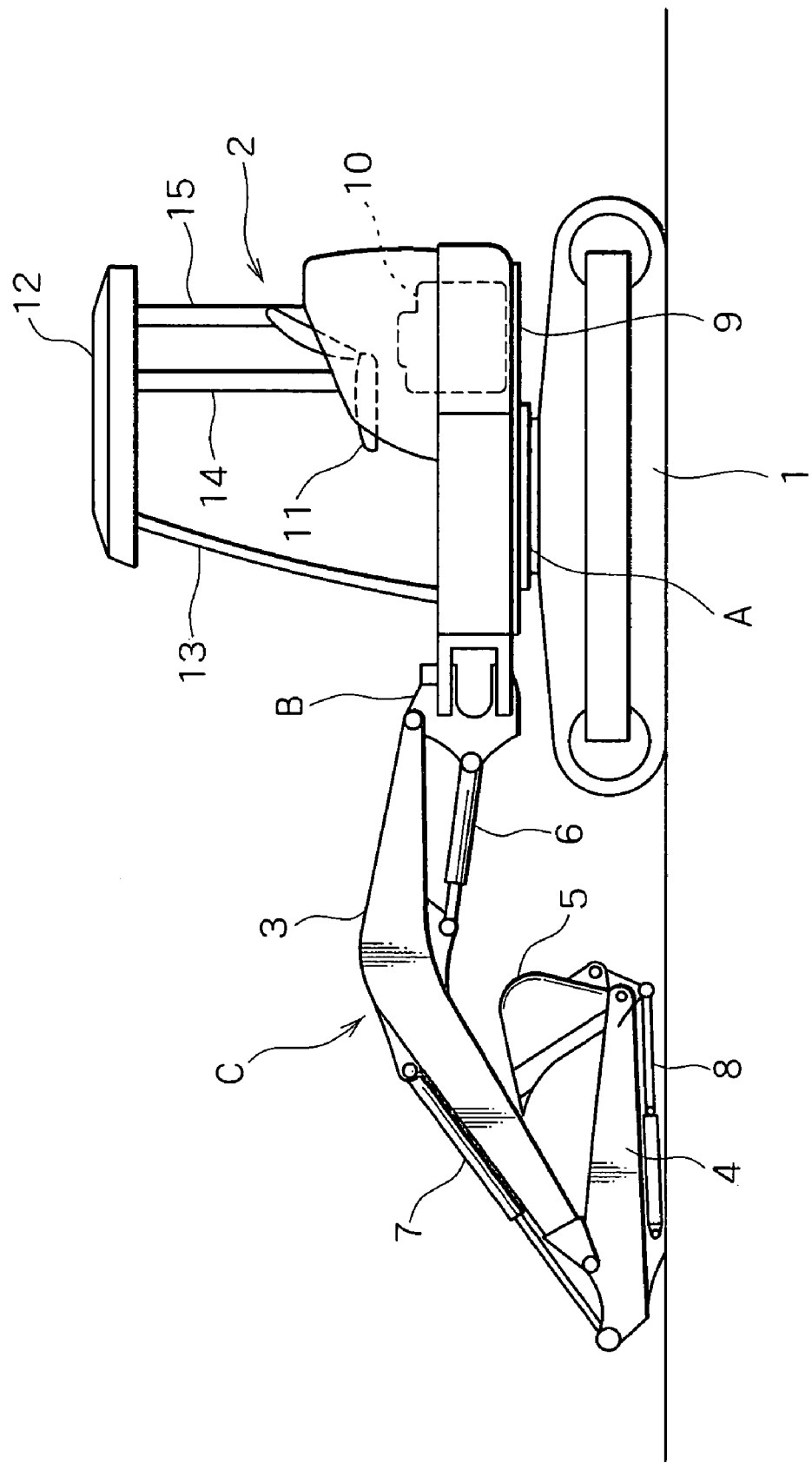
FIG. 14 is a schematic side view of a hydraulic excavator to which the present invention is applied.

First, with reference to FIG. 14, a description will be given of a basic construction of a working machine to which a fuel tank mounting structure according to the present invention is applicable. FIG. 14 illustrates a small-sized hydraulic excavator called a compact excavator which is a kind of a working machine. In this hydraulic excavator, an upper rotating body 2 is mounted rotatably on a lower traveling body 1 so as to be rotatable about a vertical shaft (swing shaft) through a swing bearing A. A support bracket B is provided on the upper rotating body 2 and a working device C comprising a boom 3, an arm 4, a bucket 5, and cylinders 6, 7 and 8 for actuating the boom, arm and bucket respectively, is attached to the support bracket B.

The upper rotating body 2 is provided with an upper frame 9 as a swing base. Various devices, including an engine 10, as well as covers (exterior parts) for covering those devices, an operator's seat 11 and a canopy 12, are mounted on the frame 9. Numerals 13, 14, and 15 denote front, left, and right support posts, respectively, for supporting the canopy 12.

Fuel tank mounting structures embodying the present invention will be described below with reference to FIGS. 1 to 13, provided the invention is not limited thereto.

In the following embodiments, the same portions will be identified by the same reference numerals and tautological explanations thereof will be omitted.

First Embodiment (see FIGS. 1 to 7)

Figure 1:
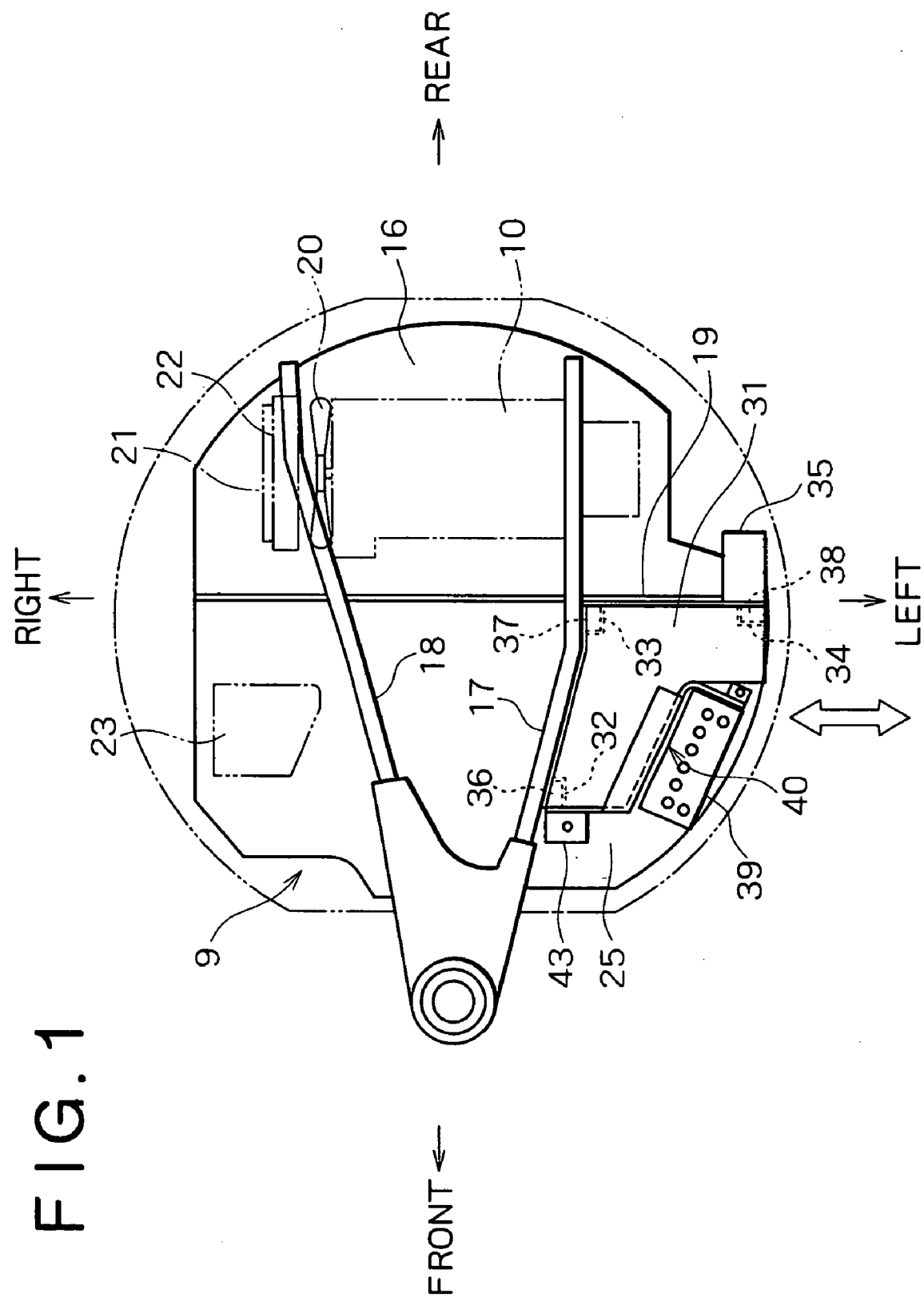
FIG. 1 is a schematic plan view of the whole of an upper frame in a working machine according to a first embodiment of the present invention.

FIG. 1 shows an arrangement of devices on the upper frame 9. Numeral 16 denotes a bottom plate of the frame 9. On the bottom plate 16, main frames (may also be designated longitudinal (ribs) 17 and 18 as longitudinally extending walls are disposed on both right and left sides (as seen in a sat state of operator on the operator's seat; this is also true of the following directions of right, left and front, rear), and a transversely extending partition wall 19 is provided in a crossing relation to the frames 17 and 18. In a rear portion (engine room) of the upper frame defined by the partition wall 19, there are installed such drive units as engine 10, fan 20, radiator 21, and oil cooler 22.

On the other hand, a hydraulic oil tank 23 is installed on a front right side with respect to the partition wall 19.

As shown in FIG. 1, on a front left side in the upper frame 9, there is provided a tank/battery mounting portion 25 (hereinafter referred to simply as the tank mounting portion 25) for mounting a fuel tank 31 (simply "tank" hereinafter) and a battery 39. The tank mounting portion 25 is defined by the left main frame 17 and the partition wall 19. The tank 31 stores fuel to be fed to the engine 10.

The tank 31 and the battery 39 are mounted to the tank mounting portion 25 removably. At the time of mounting the tank 31 and the battery 39, both are inserted into the mounting portion 25 from the left-hand side of the machine body (lower side in the figure), as indicated with a white arrow in FIG. 1. For cleaning and maintenance, both tank and battery are sideways moved leftwards and substantially horizontally, whereby both are taken out to the outside of the machine body.

The tank 31 is formed of a plastic material in a generally L shape whose rear portion is bent to the left side, as shown in FIG. 1. Although a plastic tank is used in this embodiment, the tank 31 having a generally L-shaped portion may be a metallic tank.

In connection with the structure of the tank mounting portion, there is adopted the following restricting (fixing) means to prevent the tank 31 after mounting from moving in any of horizontal directions other than its removable direction or in a vertical direction.

As shown in the figures, the frame 17 which defines the tank mounting portion 25 is formed with front and rear convex portions 32, 33 as engaging portions on the machine body side, the convex portions 32 and 33 being formed on both front and rear sides of the surface which faces the tank 31 in a mounted state of the tank.

On a rear left side of the tank mounting portion 25, there is disposed a canopy support post base 35 on which is mounted a canopy left support post 14 shown in FIG. 14. A left convex portion 34 as an engaging portion on the machine body side is formed on a front face of the support post 35.

Figure 2:
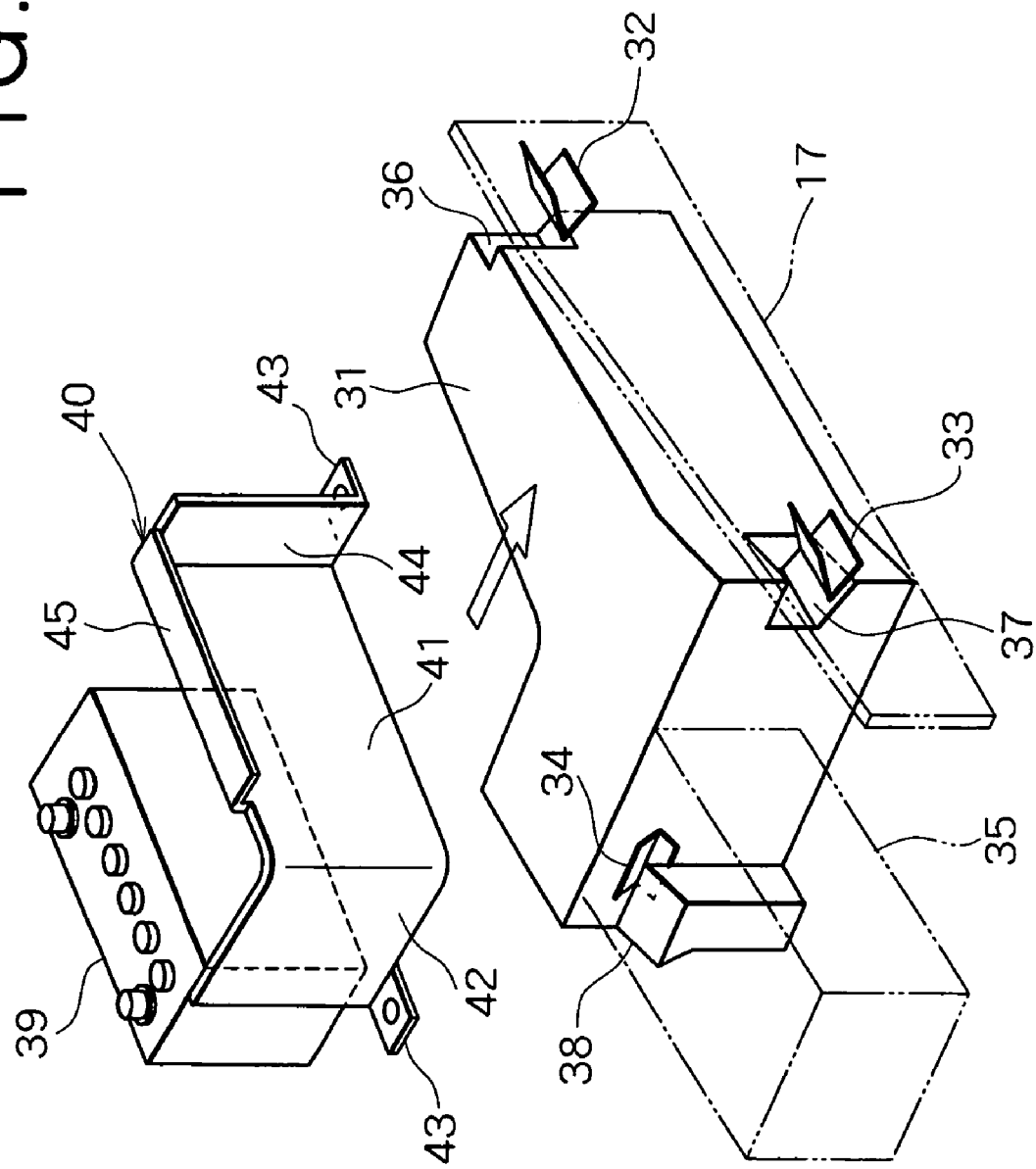
FIG. 2 is a perspective view of a tank mounting portion, showing a state before mounting of a fuel tank.
Figure 3:
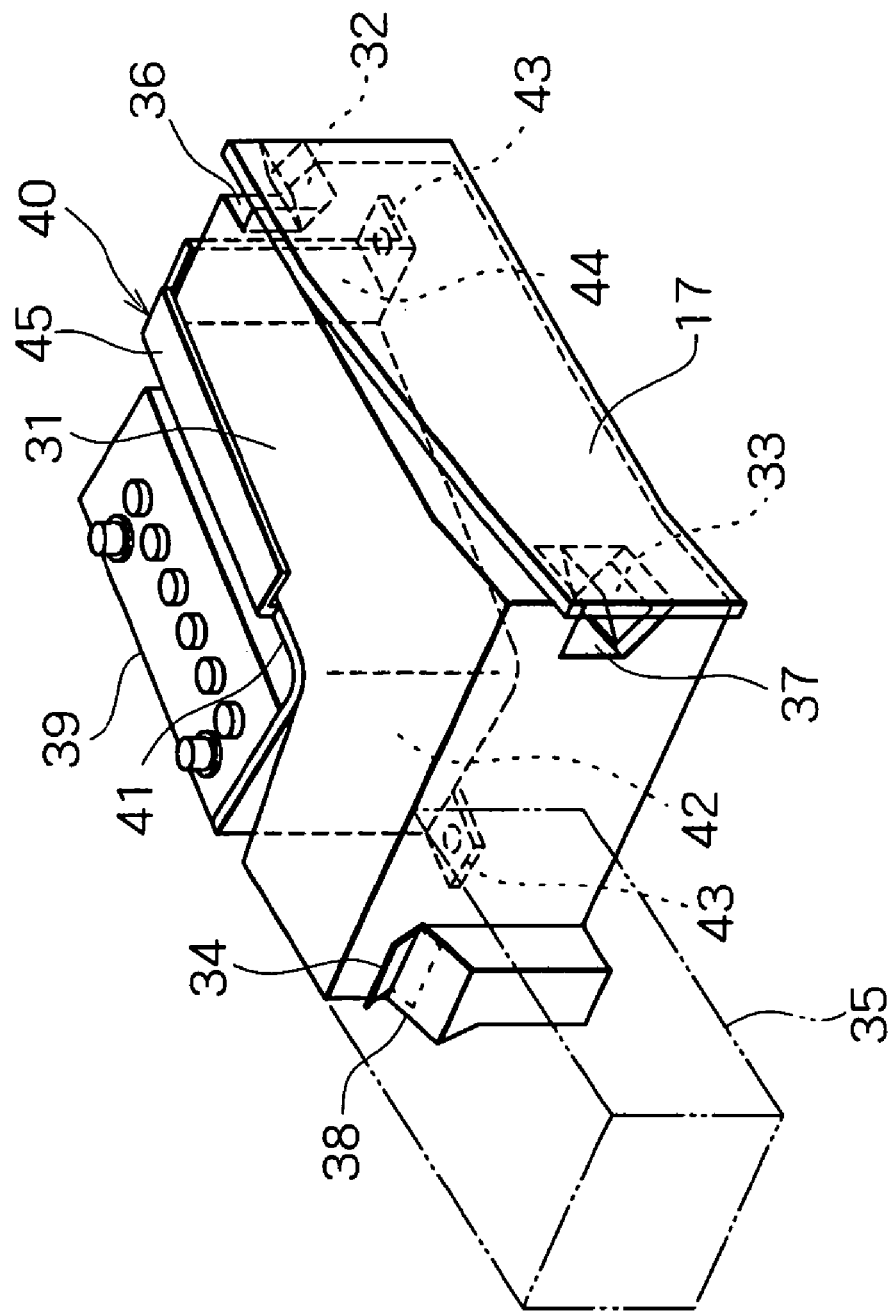
FIG. 3 is a perspective view of the tank mounting portion, showing a mounted state of the fuel tank.
Figure 5:
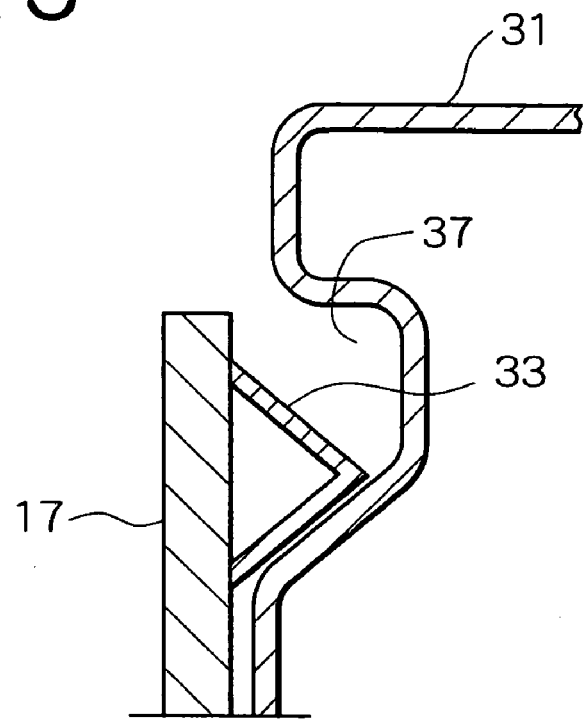
FIG. 5 is an enlarged sectional view taken on line V-V in FIG. 4.

The convex portions 32, 33, and 34 are formed by fixing angle members (bent members) to the frame 17 and the canopy support post 35 by welding for example, as shown in FIGS. 2, 3, and 5.

On the other hand, in the tank 31 are formed front and rear concave portions 36, 37 as tank-side engaging portions, the concave portions 36 and 37 being formed in the tank at positions (both front and rear sides of the right-hand wall) corresponding to both convex portions 32 and 33 in a set state of the tank to the tank mounting portion 25.

Further, on a rear left side of the tank 31, there is formed an outwardly expanded portion 38 as an engaging portion. As shown in FIG. 3, when the tank is set or fixed on the tank mounting portion 25, the left convex portion 34 is put in engagement with an upper surface side of the expanded portion 38.

The front concave portion 36 opens on both right and front sides, while the rear concave portion 37 opens on both right and rear sides. The expanded portion 38 is formed at a lower position than the left convex portion 34, as noted above.

Thus, by merely inserting the tank 31 into the tank mounting portion 25 horizontally from the left side, the concave portions 36, 37 and the expanded portion 38 formed on the tank side and the convex portions 32, 33, and 34 formed on the machine body side come into engagement with each other automatically. In this case, since the engaging portions are engaged with each other by only inserting the tank 31 in one horizontal direction into the tank mounting portion 25, it is not necessary to perform any special operation for the tank, whereby the tank mounting operation is more simplified.

FIG. 5 shows an engaged state between the rear convex portion 33 and the rear concave portion 37.

Under the engaging action at the above three positions, it is possible to prevent the tank 31 from moving in other horizontal directions than the tank removable direction, that is, from moving forward, backward and rightward.

Moreover, at the engaging portions, the convex portions 32, 33, and 34 are engaged with the concave portions 36, 37 and the expanded portion 38 in a forced-down state from above (see FIG. 5). Therefore, vertical movements, of the tank 31 after mounting can be prevented.

Accordingly, by preventing leftward dislodgment of the tank 31 in this state, the mounting of the tank 31 to the tank mounting portion 25 is completed. It is also possible to let the main frame 17 of the upper frame 9 serve as a stopper in the inserting direction of the tank 31.

Next, the following description is now provided about the fuel tank dislodgment preventing means (simply "tank dislodgment preventing means" hereinafter) to prevent the tank 31 from moving out of a fixed position.

In this embodiment, there is adopted a construction wherein the battery 39 is disposed adjacently on the left side of the tank 31 for the tank mounting portion 25. Further, a bracket 40 for mounting the battery 39 is mounted removably on the bottom plate 16 in adjacency to the tank 31. According to this construction, the bracket 40 for mounting the battery 39 is used also as a tank dislodgment preventing means. Consequently, the tank mounting structure is more simplified and is reduced in both size and weight.

Of course, a special tank dislodgment preventing bracket used exclusively for the tank mounting portion 25 may be provided if there is a sufficient mounting space for example.

More specifically, in the mounting portion 25, the battery 39 is disposed adjacent the tank 31 on the left side (outside) of the tank 31 and within a space formed between the curved portion of the tank 31 and the machine body. Thus, the tank 31 is mounted while its movement in its take-out direction is prevented (prevented from dislodgment) by the battery 39, more particularly, by the bracket 40 for mounting the battery or battery mounting bracket. As noted above, since the tank 31 is formed in a generally L shape and the battery 39 is disposed in the space formed inside the curved portion of the tank, both tank and battery can be installed compactly in a minimum occupancy space while ensuring a maximum tank capacity. In this case, the shape of the tank 31 is not limited to the generally L shape, but may be changed insofar as the mounting space of the battery 39 can be ensured.

As shown in FIG. 2 for example, the bracket 40 has a side plate 41 which comes into contact with the right side face of the battery 39 and which also serves as a tank receiving portion, and a rear plate 42 which comes into contact with a rear face of the battery. The side plate 41 which also functions as a tank receiving portion comes into contact with the tank 31 in a direction of preventing removal of the tank, thus acting as a tank dislodgment preventing means.

A pair of fixing portions 43 of the bracket 40 are fixed onto the tank mounting portion 25 with use of fixing means such as screws. The battery 39 is fixed to the bracket through fixing means such as a frame or rod and bolts and nuts (none of them are shown) while its right side face and rear face are restrained by the side plate 41 and the rear plate 42, respectively.

Figure 4:
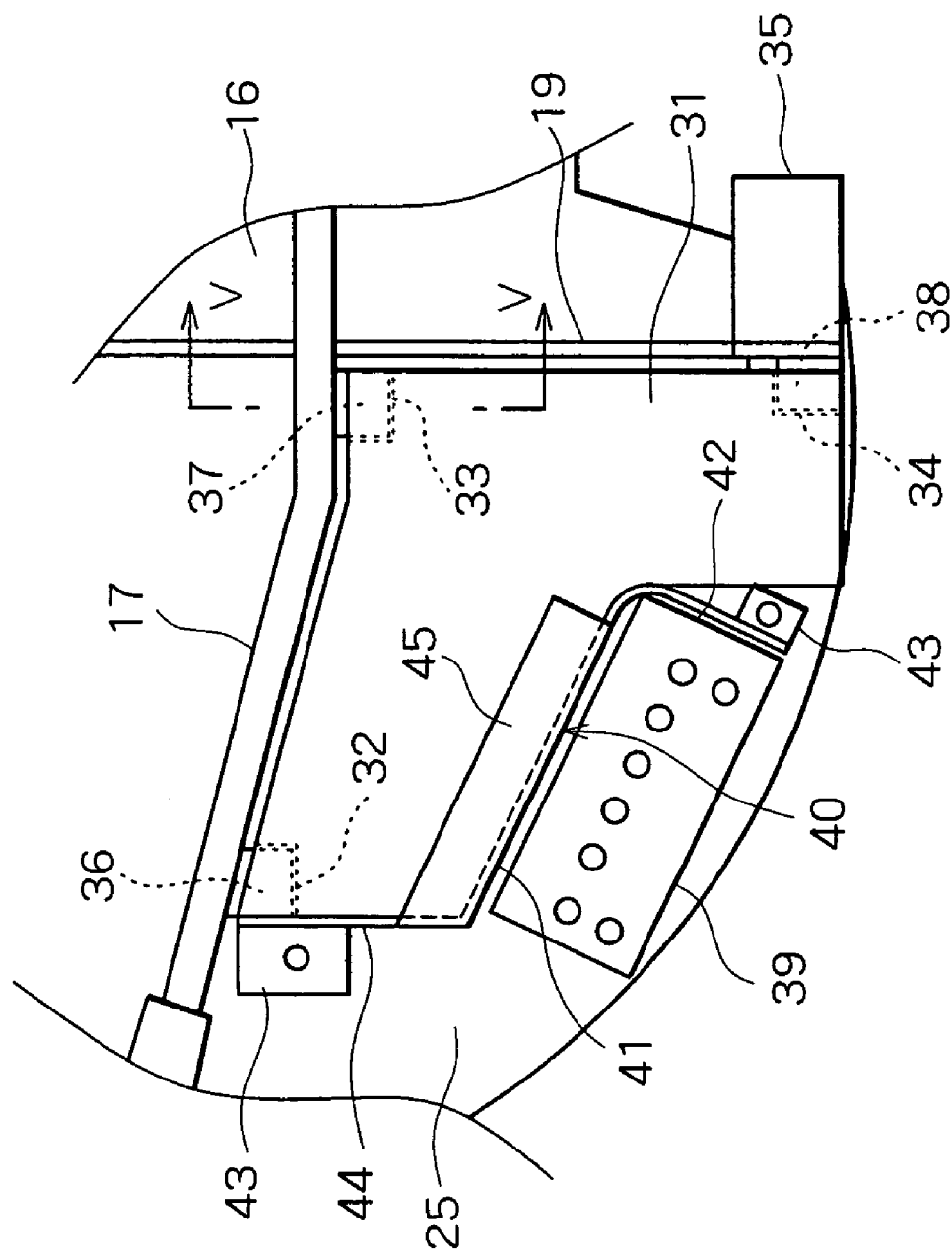
FIG. 4 is a plan view thereof.

In this state, both side plate 41 and rear plate 42 of the bracket 40 are in contact with the tank 31, as shown in FIGS. 3 and 4, so that a leftward movement (extraction) of the tank 31 is prevented by the side plate 41. Likewise, a forward movement of the tank 31 is prevented by the rear plate 42.

Further, the bracket 40 is provided at a front end thereof with a vertical tank support portion (fuel tank support portion) 44 and is also provided at an upper end thereof with a horizontal tank holding portion 45. A forward movement (a movement in a substantially horizontal direction other than the removable direction of the tank 31) is prevented by the tank support portion 44. Moreover, a vertical movement of the tank 31 is prevented because the tank is held down from above by the tank holding portion 45.

As a result, the tank 31 can be installed in the tank mounting portion 25 in a state in which its movement in vertical directions and in all of horizontal directions, including its removable direction, is prevented in a doubly ensured manner. Since the tank 31 can thus be installed in a very stable manner, it is possible to enhance the tank mounting stability.

Besides, at the time of cleaning or maintenance of the tank 31, if the battery 39 and the bracket 40 are removed from the tank mounting portion 25, the tank becomes free in its removable direction. Thus, the tank 31 can be removed easily.

The battery 39 and the battery mounting bracket 40 can also serve as means for preventing dislodgment of the tank 31. Consequently, it is not necessary to use any dedicated tank dislodgment preventing means. That is, the tank mounting structure can be simplified and reduced in both size and cost.

In this embodiment, the side plate 41 of the bracket 40 is interposed between the tank 31 and the battery 39 to isolate the tank 31 from the battery 39. Consequently, an interinfluence caused by an adjacent arrangement of the two, (for example, the transfer of fuel and water adhered thereto to the battery or the transfer of battery heat to the fuel tank), can be prevented.

Moreover, according to This Construction:

(i) All that is required for the tank mounting structure is only partially forming convex portions 32 to 34 on the machine body side (left main frame 17 and canopy support post 35) and concave portions 36, 37 and expanded portion 38 on the tank 31 side.

(ii) It is possible to let the battery mounting bracket 40 serve also as a tank dislodgment preventing means and let the frame 17 serve also as a stopper in the tank inserting direction.

As a result, it is not necessary to use a dedicated bracket of large size and weight and hence it is possible to simplify the whole of the tank mounting structure to a remarkable extent and hence possible to attain the reduction of size, weight and cost. Besides, since it is no longer required to perform the clamping band attaching and detaching operations which are troublesome, it becomes easier to mount and remove the tank 31 and the battery 39.

Although in this embodiment the tank support portion (front tank support portion) 44 and the tank holding portion (upper tank support portion) 45 are formed in the bracket 40, they may be omitted.

Conversely, the dedicated tank mounting structure (convex portions 32 to 34 and concave portions 36, 37 or expanded portion 38) may be omitted because movements of the tank 31 in various directions can be prevented by the whole of the bracket 40 including both tank support portions 44 and 45.

There may be adopted a construction wherein as the battery mounting bracket there is used a structure having nothing to do with dislodgment prevention for the tank 31 and the dislodgment of the tank is prevented directly by the battery 39.

On the other hand, the tank 31 may be formed in an outwardly concave shape and the battery 39 may be disposed within the concave.

Although the present invention is suitable for a hydraulic excavator, especially a small-sized excavator, it is also applicable widely to other working machines, e.g., a ditcher constructed with an excavator as a matrix.

Further, the Following Modifications may be Adopted.

(1) Conversely to the above embodiment, convex portions may be formed on the tank side and concave portions or expanded portion may be formed on the machine body side. Concave portions may be formed in a closed shape on all sides or concave portions may be closed on all sides.

Figure 6:
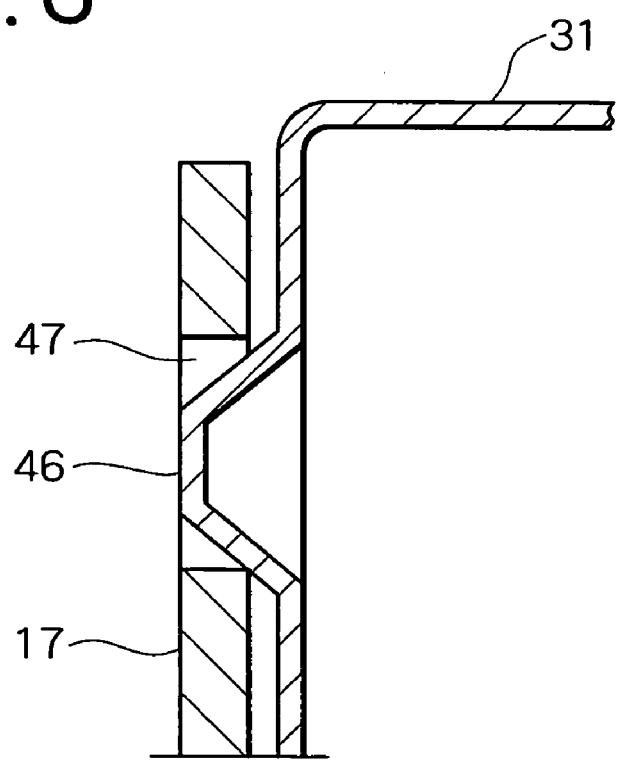
FIG. 6 is a view corresponding to FIG. 5, showing a modification.

Or, there may be adopted a construction wherein a convex portion 46 formed on the tank side is fitted in a hole 47 formed on the machine body side (the left main frame 17 is illustrated in the figure), as shown in FIG. 6. The hole 47 may be formed by a concave portion closed on all sides.

Figure 7:
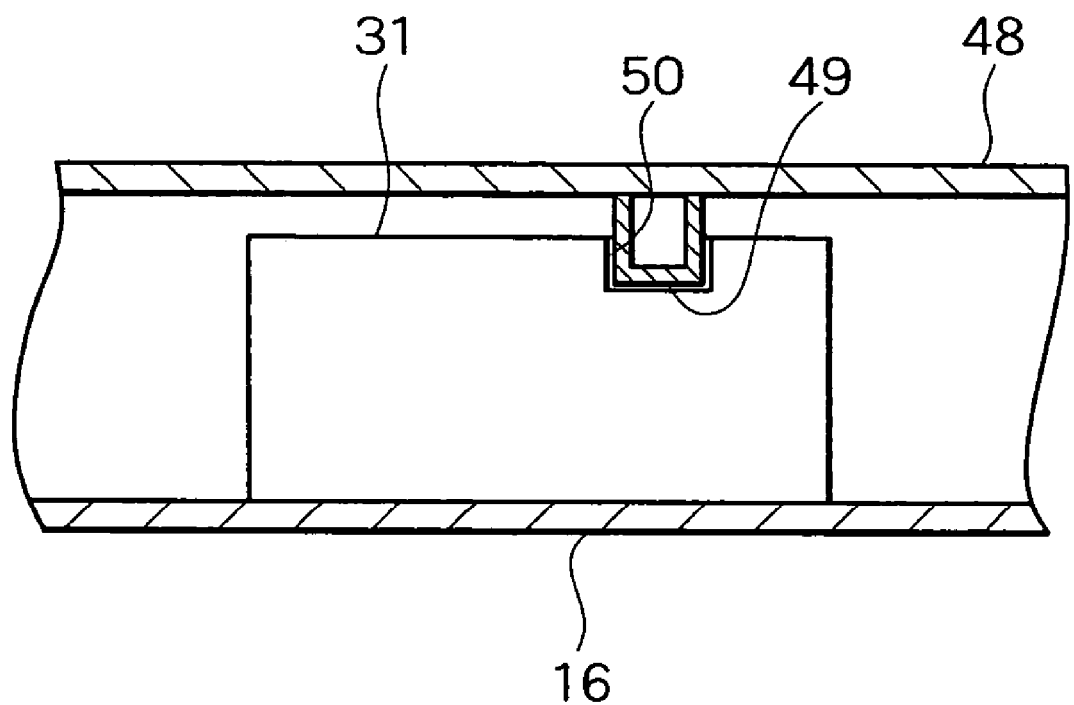
FIG. 7 is a sectional view of an engaging portion in another modification.
Figure 8:
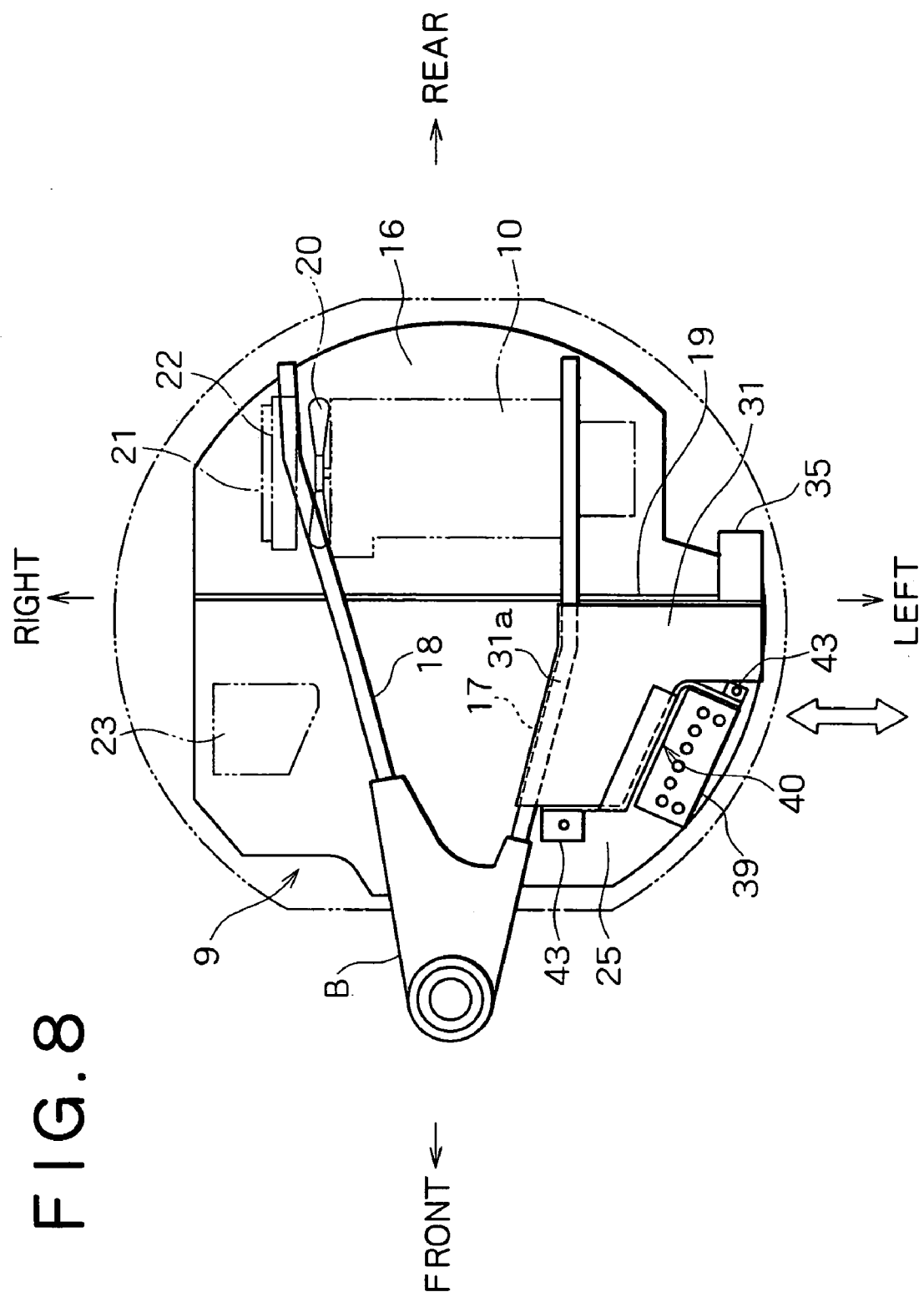
FIG. 8 is a schematic plan view of the whole of an upper frame in a working machine according to a second embodiment of the present invention.

(2) In the above embodiments, the convex portions 32 to 34 and the concave portions 36, 37, as well as the expanded portion 38, are formed so as to be mutually engaged automatically upon insertion of the tank. There may be adopted such a construction as shown in FIG. 7 wherein a floor plate 48 is disposed vertically spacedly above the bottom plate 16 of the upper frame and the tank 31 is mounted within the space between the bottom plate 16 and the floor plate 48. In this case, it is preferable that a downward convex portion 49 be formed on a lower surface of the plate 48 and is brought into engagement with a concave portion 50 formed in an upper surface of the tank 31, whereby the position of the tank 31 can be restricted so as not to permit vertical and horizontal movements of the tank.

According to this construction, the above engaging portion can also function as a tank dislodgment preventing means, thus making it possible to omit the tank dislodgment preventing means which has been provided separately.

(3) In case of adopting the construction wherein the tank dislodgment preventing means is provided separately from the engaging portion, it is desirable, in point of reducing the number of parts and weight and simplifying the structure, that the battery mounting bracket 40 be used also as a tank dislodgment preventing means as in the above embodiment. On the other hand, if it is impossible to adopt such a combined-use construction due to a limited mounting space for devices, there may be added a dedicated tank dislodgment preventing means.

Second Embodiment (see FIGS. 8 to 13)

A second embodiment of the present invention will be described below with reference to FIGS. 8 to 13.

In this embodiment, the same portions as in the previous first embodiment will be identified by the same reference numerals and tautological explanations thereof will be omitted.

As illustrated in the figures, a tank 31 is formed in L shape having a rear portion bent to the left side. The tank 31 is mounted in a tank mounting portion 25 in a state in which a longitudinal side portion of the L shape is in contact with a left main frame 17 and a lower side portion thereof is in contact with a partition wall 19 (the "contact" means a closely contacted state or a closely opposed state through a slight gap).

A projecting portion 31a projecting to the frame 17 side (right side) is formed in an upper end portion of the tank 31.

The projecting portion 31a is formed in a hollow shape so as to permit the storage of fuel as part of the tank 31. With the projecting portion 31a, it is possible to increase the tank capacity in comparison with the case where the projecting portion 31a is not formed.

The tank 31 is mounted in the tank mounting portion 25 in a state in which the projecting portion 31a projects to the right side beyond the frame 17, as illustrated in the figures.

An upper surface of the frame 17 is formed so as to provide a rearwardly declining slant surface so that a load acting on the support bracket B from the working device C in FIG. 14 can be transmitted efficiently to the lower traveling body 1 through the bottom plate 16 and the swing bearing A. To match this slant surface, a lower surface 31b of the tank projecting portion 31a is formed so as to provide a rearwardly declining slant surface extending along the upper surface of the frame 17.

Above the bottom plate 16 and in the front portion of the upper frame, including the tank mounting portion 25, a floor plate 48 (see FIGS. 10 and 11) is mounted so as to form a space between it and the bottom plate 16 and also form a gap 51 between it and the inclined upper surface of the left frame 17, the gap 51 being triangular in side view.

Thus, the projecting portion 31a of the tank 31 is fitted in the gap 51 and assumes a sandwiched state in between the upper surface of the frame 17 and the plate 48.

Since the lower surface of the projecting portion 31a is inclined to match the inclination of the upper surface of the frame 17, it is possible to maximize the volume of the projecting portion 31a. The volume of the projecting portion 31a serve as an additional capacity of the tank 31, that is, the tank capacity can be further increased.

In some type of a working machine, the floor plate 48 is constituted by a plate body and a maintenance cover capable of being opened and closed. The plate installed above the tank is here designated a floor plate.

On the other hand, in the above mounted state, the projecting portion 31a of the tank 31 is restrained vertically and a forward movement thereof is inhibited by the inclination of the upper surface of the main frame.

Further, rightward and backward movements of the tank 31 are prevented by the frame 17 and the partition wall 19, respectively.

Thus, since the projecting portion 31a is sandwiched in between the frame 17 and the plate 48, this gripping force permits the tank 31 to be restrained in its mounting position. Further, if the gripping force of the projecting portion 31a is set rather strong, it becomes possible to restrain the tank 31 in all directions, which is convenient. In this case, the movement of the tank 31 can be prevented in all directions, including the tank removing direction. Consequently, it becomes possible to omit the structure for holding the tank 31 at the tank mounting position or greatly simplify the same structure and thereby reduce the size and weight thereof.

In addition, it is preferable to adopt a construction wherein a concave portion be formed in the tank upper surface and a convex portion be formed on the lower surface of the plate 48 so as to be engaged with each other. In this case, without the aforesaid gripping force, it is possible to realize the function of preventing dislodgment of the tank 31.

Thus, even with only the above construction, the tank 31 can be held satisfactorily in the tank mounting portion 25, but it is also possible to add the following tank holding means.

Figure 9:
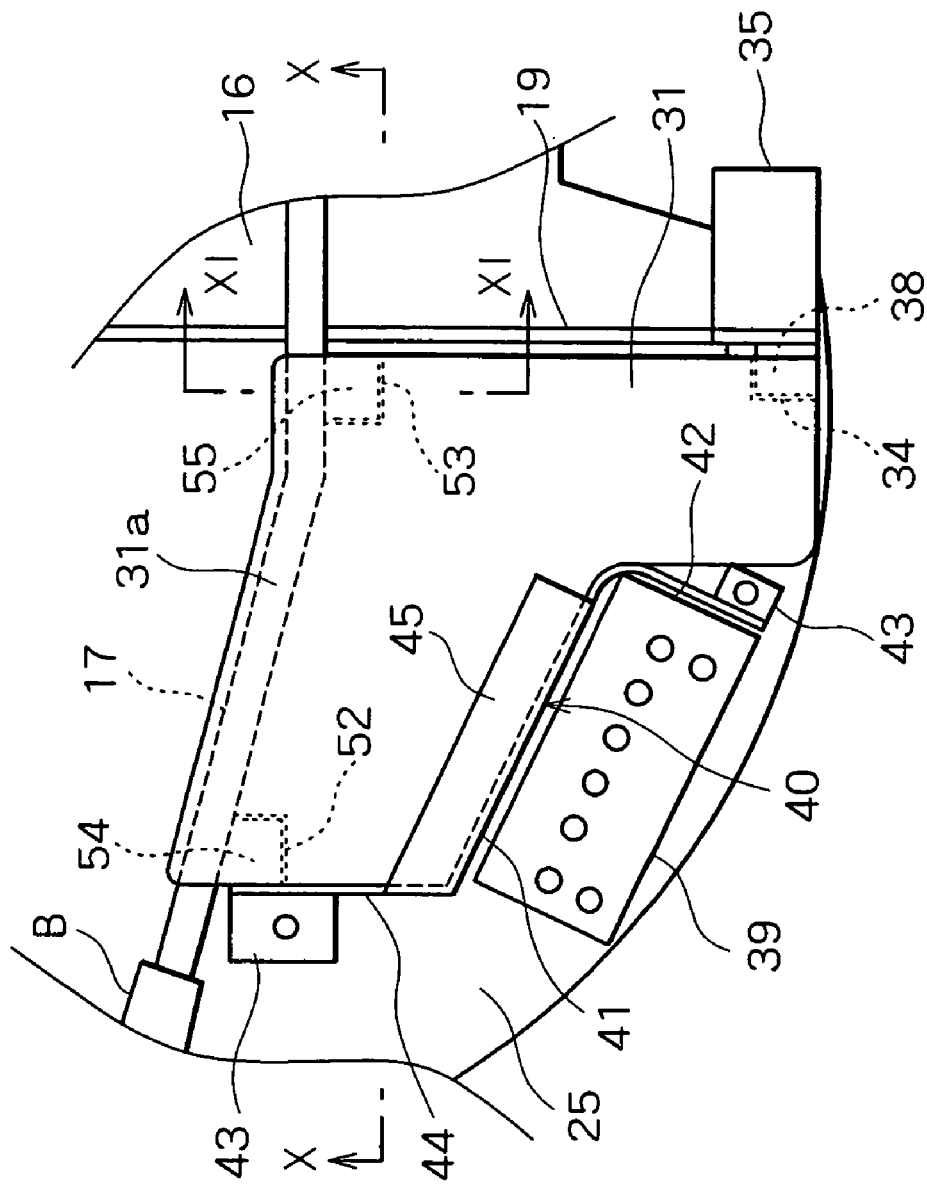
FIG. 9 is an enlarged plan view of a mounting portion for both a fuel tank and a battery in the second embodiment.
Figure 10:
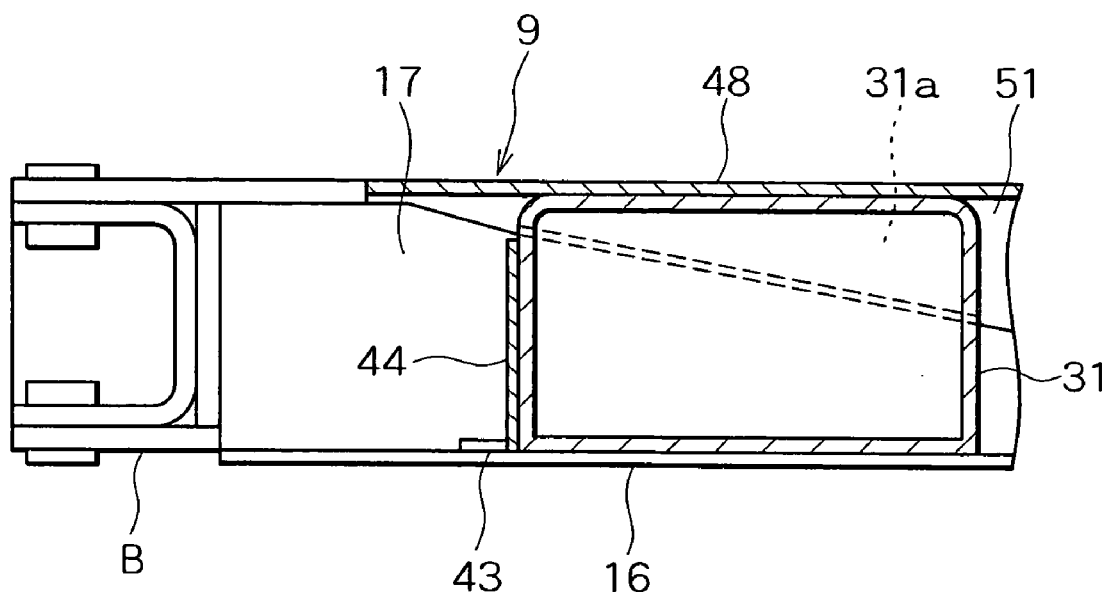
FIG. 10 is a sectional view taken on line X-X in FIG. 9.
Figure 12:
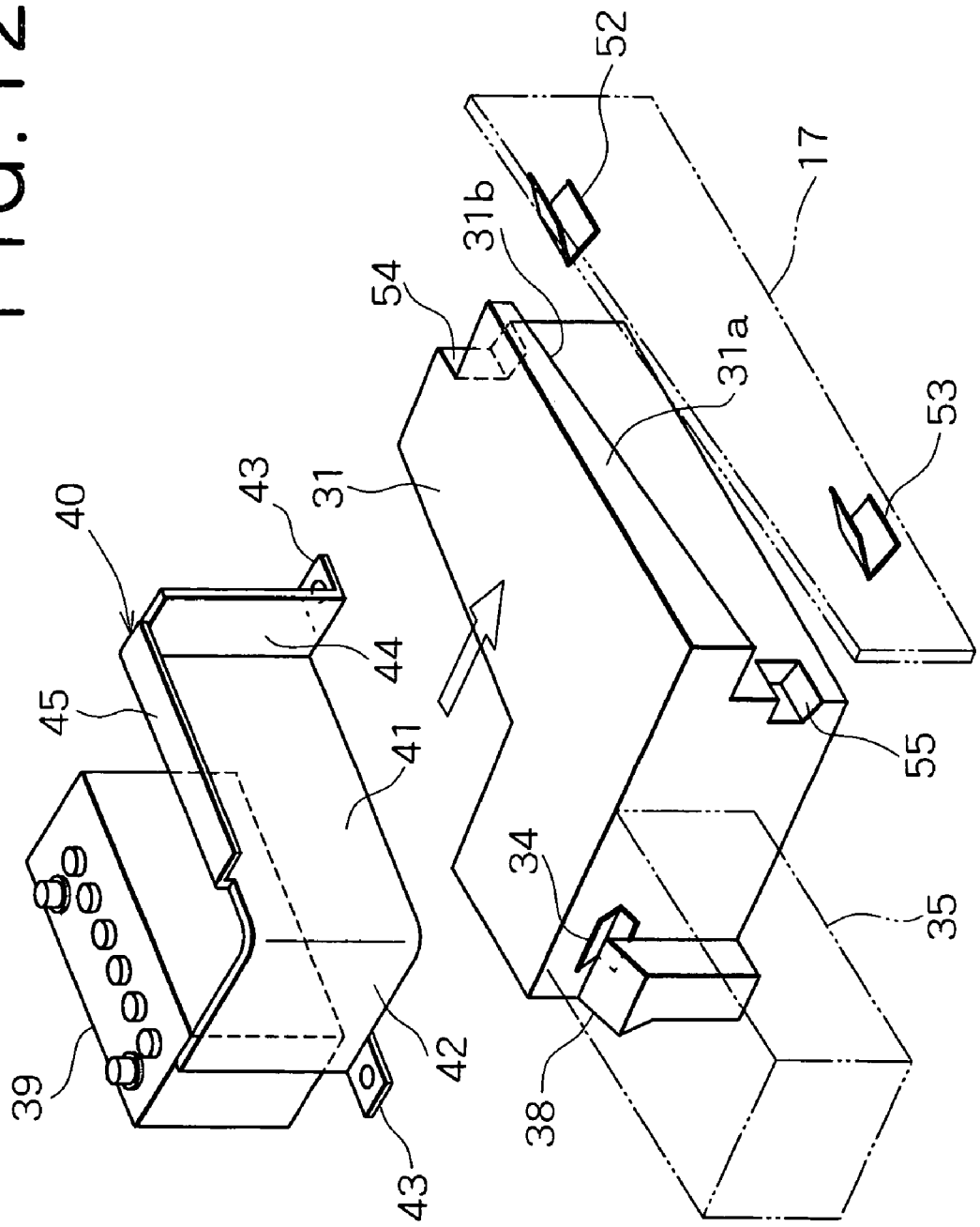
FIG. 12 is an exploded perspective view showing the fuel tank and the battery, as well as a mounting structure for mounting them, in the second embodiment.
Figure 13:
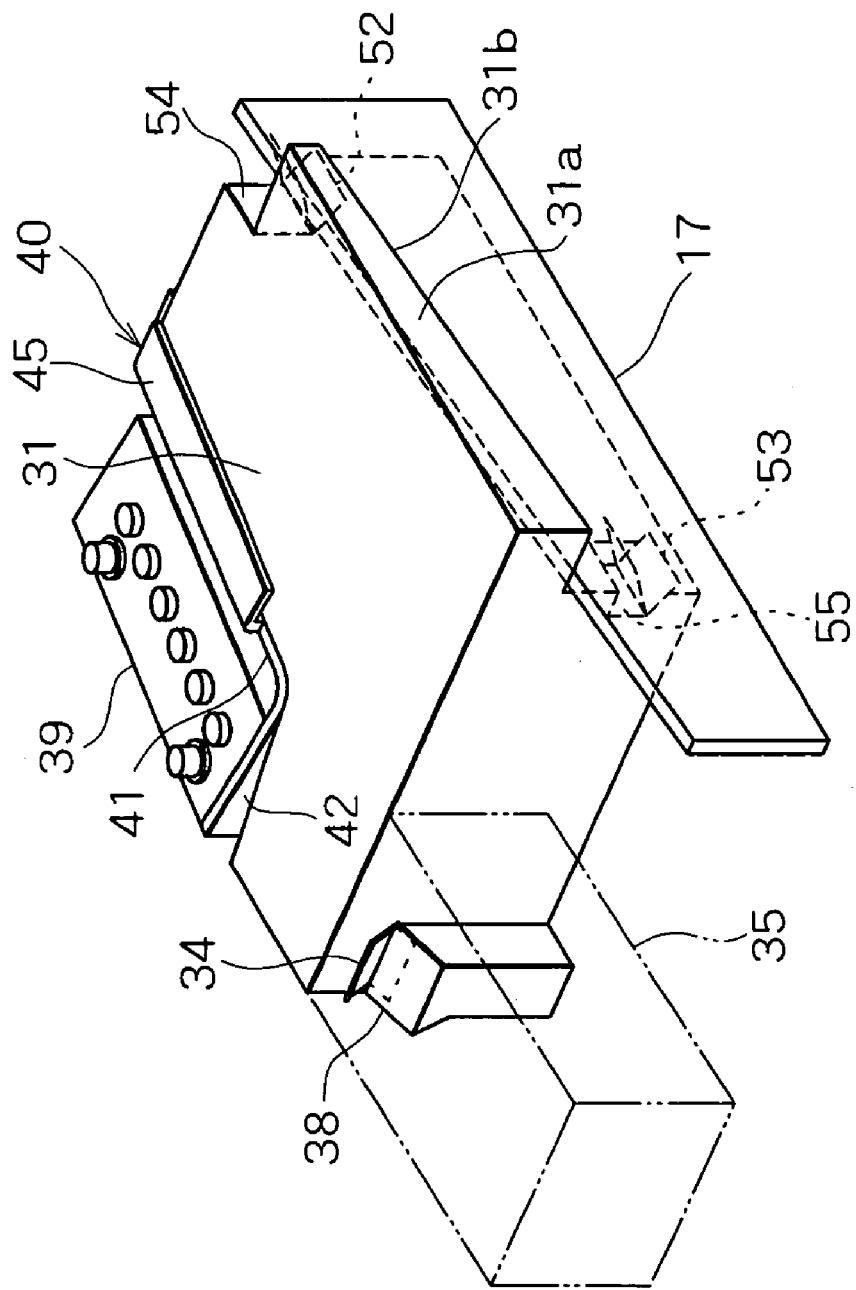
FIG. 13 is a perspective view of the mounting structure, showing a mounted state of the fuel tank and the battery.

As shown in FIGS. 9, 12 and 13, front and rear convex portions 52, 53 are formed at front and rear positions respectively of the frame 17 on the side which faces the tank 31 as mounted.

A canopy support post base 35, on which the canopy left support post 14 shown in FIG. 14 is to be mounted, is provided on the left side behind the tank mounting portion 25. A convex portion 34 (left convex portion) is formed on a front face of the canopy support post base 35.

Figure 11:
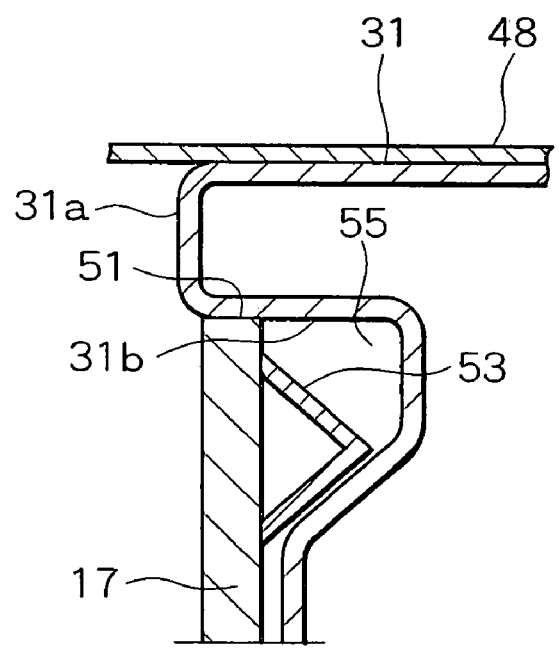
FIG. 11 is an enlarged sectional view taken on line XI-XI in FIG. 9.

The convex portions 52, 53, and 34 are formed by fixing angle members to the frame 17 and the canopy support post base 35 by welding for example, as shown in FIGS. 11 to 13.

On the other hand, front and rear concave portions 54, 55 are formed in positions (front and rear positions of the right side wall) corresponding respectively to the front and rear convex portions 52, 53 with the tank 31 set in the tank mounting portion 25.

Further, an outwardly projecting expanded portion 38 is formed at a left position of the rear face of the tank 31. As shown in FIG. 13, with the tank set in the tank mounting portion 25, the left convex portion 34 comes into engagement with the upper surface side of the expanded portion 38.

When the tank is mounted, the front concave portion 54 opens to both right side and front, while the rear concave portion 55 opens to both right side and rear. As noted earlier, the expanded portion 38 is formed at a lower position than the left convex portion 34.

Therefore, by merely inserting the tank 31 horizontally from the left side into the tank mounting portion 25, the concave portion 54, 55 and expanded portion 38 formed on the tank side and the convex portions 52, 53, 54 formed on the machine body side come into engagement with each other automatically. In FIG. 11 there is shown an engaged state between the rear convex portion 53 and the rear concave portion 55.

By the action of engagement in these three engaging portions, it is possible to prevent the tank 31 from moving in other horizontal directions than its removable direction, i.e., in such horizontal directions as front, rear and right side.

In those engaging portions, the concave portions 54, 55 and the expanded portion 38 can engage the convex portions 52, 53 and 34 in such a state as hold down the convex portions from above (see FIG. 11), whereby the tank 31 can be fixed so as not to move vertically.

Moreover, this embodiment is constructed in such a manner that the bracket 40 for mounting the battery 39 serves also as means for preventing dislodgment of the tank 31 to the left side.

As in the first embodiment, the battery 39 is disposed adjacent the tank 31 on the left side (outside) of the tank and within the space formed inside the curved portion of the tank.

As shown in FIGS. 9, 12, and 13, the bracket 40 has a side plate 41 and a rear place 42 which are in contact with the right side face and the rear face, respectively, of the battery 39 and is screwed to the bottom plate 16 of the tank mounting portion 25 by means of a pair of fixing portions 43.

The battery 39, with its right side face and rear face restrained by the side plate 41 and the rear plate 42, respectively, of the bracket 40, is fixed to the bracket with fixing means such as a frame or rod and bolts and nuts.

In this state, as shown in FIGS. 9 and 13, the side plate 41 and the rear plate 42 of the bracket 40 are in contact with the tank 31. As a result, a leftward movement (extraction) of the tank 31 is prevented by the side plate 41 and a forward movement thereof is prevented by the rear plate 42.

Further, the bracket 40 is provided at a front end thereof with a vertical tank support portion 44 and is also provided at an upper end thereof with a horizontal tank holding portion 45 as an upper tank support portion. Therefore, a forward movement of the tank 31 is prevented by the front tank support portion 44 and the tank is held down from above by the tank holding portion 45.

Consequently, the tank 31 is mounted to the tank mounting portion 25 extremely stably in a state in which its movement in vertical directions and in all of horizontal directions, including its removable direction, is prevented in a doubly ensured state.

Besides, at the time of cleaning or maintenance of the tank 31, the tank becomes free in its removable direction by taking off the battery 39 and the bracket 40 from the mounting portion 25, and thus the tank can be removed easily.

Further, the Following Modifications may be Applied.

(1) Independently of the bracket 40, as described earlier, the tank 31 is prevented from moving in various directions by the projecting portion 31a, the main frame 17 and the floor plate 48. Therefore, the holding structure using the bracket 40 may be more simplified than in the above embodiment or may be substituted by a simpler holding structure, or may be omitted.

(2) Although in the above embodiment the battery 39 is juxtaposed to the tank 31, the present invention is applicable also to the case where any other device is disposed side by side with the tank 31.

Further, the present invention is applicable to the case where the tank 31 alone is installed in a dedicated mounting portion. Also in this case, because of an increase of the tank capacity by the projecting portion 31a, an effect can be exhibited in a condition in which space is greatly restricted particularly in a small-sized hydraulic excavator and a reduction of tank capacity is required.

(3) Although in the above embodiment the frame 17 serves as a longitudinal wall for restricting the tank capacity, the present invention is also applicable to the case where another longitudinal wall is present in the tank mounting portion.

In this case, if an upper surface of the longitudinal wall is horizontal, the lower surface 31b of the projecting portion 31a of the tank 31 may also be protruded horizontally.

Further, the modifications of the first embodiment may be applied also to this embodiment.

Although the invention has been described with reference to the preferred embodiments in the attached figures, it is noted that equivalents may be employed and substitutions made herein departing from the scope of the invention as recited in the claims.

We claim:

1. A working machine comprising:
a fuel tank mounted removably in a tank mounting portion within a machine body of said working machine, said fuel tank being removable in a substantially horizontal direction as its removable direction out of the machine body;
a battery mounted removably on said working machine by a battery mounting bracket; and
engaging portions formed respectively on both said machine body and said fuel tank, said engaging portions being adapted to come into engagement with each other in an engaged state when said fuel tank is set in said tank mounting portion and to prevent in the engaged state said fuel tank from moving in vertical directions and in substantially horizontal directions other than the direction in which said fuel tank is removable;

wherein said battery mounting bracket is positioned to prevent said fuel tank from moving in the removable direction when set in said tank mounting portion.

2. The working machine according to claim 1, further comprising a lower traveling body and an upper rotating body mounted rotatably on said lower traveling body.

3. The working machine according to claim 2, wherein a main frame having a longitudinally extending wall is disposed on a bottom plate of an upper frame of said upper rotating body, and one of said engaging portions is formed in said main frame.

4. The working machine according to claim 1, wherein a projecting portion is formed in part of said fuel tank.

5. A working machine comprising:
a fuel tank mounted removably in a tank mounting portion within a machine body of said working machine, said fuel tank being removable in a substantially horizontal direction as its removable direction out of the machine body;
a battery mounted removably on said working machine;
engaging portions formed respectively on both said machine body and said fuel tank, said engaging portions being adapted to come into engagement with each other in an engaged state when said fuel tank is set in said tank mounting portion and to prevent in the engaged state said fuel tank from moving in vertical directions and in substantially horizontal directions other than the direction in which said fuel tank is removable;
a fuel tank dislodgment preventing means for preventing said fuel tank from moving in the removable direction when set in said tank mounting portion,
wherein said engaging portions are adapted to come into engagement with each other automatically when said fuel tank is inserted in the substantially horizontal direction into said tank mounting portion from the outside of the machine body.

6. A working machine comprising:
a lower traveling body and an upper rotating body mounted rotatably on said lower traveling body;
a fuel tank mounted removably in a tank mounting portion within a machine body of said working machine, said fuel tank being removable in a substantially horizontal direction as its removable direction out of the machine body;
a battery mounted removably on said working machine;
engaging portions formed respectively on both said machine body and said fuel tank, said engaging portions being adapted to come into engagement with each other in an engaged state when said fuel tank is set in said tank mounting portion and to prevent in the engaged state said fuel tank from moving in vertical directions and in substantially horizontal directions other than the direction in which said fuel tank is removable;
a fuel tank dislodgment preventing means for preventing said fuel tank from moving in the removable direction when set in said tank mounting portion; and
a bracket for mounting said battery disposed removably on a bottom plate of an upper frame of said upper rotating body adjacent to said fuel tank,
wherein said fuel tank dislodgment preventing means is provided in said bracket, said fuel tank dislodgment preventing means being constituted by a fuel tank receiving portion which is formed so as to contact said fuel tank to prevent removal of the fuel tank.

7. The working machine according to claim 6, wherein a fuel tank support portion for preventing movement of said fuel tank in substantially horizontal directions other than the removable direction of the fuel tank is formed in said bracket.

8. The working machine according to claim 6, wherein an upper tank support portion for holding down said fuel tank from above is formed in said bracket.

9. The working machine according to claim 6, wherein said fuel tank receiving portion is interposed between opposed faces of said fuel tank and said battery and serves as a partition wall to isolate the fuel tank from the battery.

10. A working machine comprising:
a fuel tank mounted removably in a tank mounting portion within a machine body of said working machine, said fuel tank being removable in a substantially horizontal direction as its removable direction out of the machine body;
a battery mounted removably on said working machine;
engaging portions formed respectively on both said machine body and said fuel tank, said engaging portions being adapted to come into engagement with each other in an engaged state when said fuel tank is set in said tank mounting portion and to prevent in the engaged state said fuel tank from moving in vertical directions and in substantially horizontal directions other than the direction in which said fuel tank is removable;
a fuel tank dislodgment preventing means for preventing said fuel tank from moving in the removable direction when set in said tank mounting portion,
wherein said fuel tank and said battery are mounted so that they can be inserted and removed sideways of the machine body, and said battery is disposed so as to prevent movement of said fuel tank in the removable direction of the fuel tank.

11. The working machine according to claim 10, wherein said battery is disposed outside of said fuel tank.

12. A working machine comprising:
a fuel tank mounted removably in a tank mounting portion within a machine body of said working machine, said fuel tank being removable in a substantially horizontal direction as its removable direction out of the machine body;
a battery mounted removably on said working machine;
engaging portions formed respectively on both said machine body and said fuel tank, said engaging portions being adapted to come into engagement with each other in an engaged state when said fuel tank is set in said tank mounting portion and to prevent in the engaged state said fuel tank from moving in vertical directions and in substantially horizontal directions other than the direction in which said fuel tank is removable;
a fuel tank dislodgment preventing means for preventing said fuel tank from moving in the removable direction when set in said tank mounting portion,
wherein said fuel tank comprises a generally L-shaped portion which is bent outwards on one end side thereof.

13. The working machine according to claim 12, wherein said battery is disposed in a space formed inside the generally L-shaped portion of said fuel tank.

14. A working machine comprising:
a lower traveling body;
an upper rotating body mounted rotatably on said lower traveling body, said upper rotating body having a base constituted by an upper frame, said upper frame having a bottom plate connected rotatably to said lower traveling body through a swing bearing;

a working device attached to said upper rotating body, said working device having a boom, an arm, and a bucket;

a main frame disposed on said bottom plate, said main frame being constituted by a longitudinal wall which extends backward from a mounting portion for mounting said working device; and a fuel tank mounted on said bottom plate so as to contact said longitudinal wall of said main frame, said fuel tank having a hollow projecting portion which projects over said longitudinal wall and projects sideways at an upper end portion of the fuel tank as seen in a plan view of said working machine.

15. The working machine according to claim 14, wherein an upper surface of said main frame has a rearwards declining slant portion, and a lower surface of said projecting portion has a rearwards declining slant surface extending along the slant portion of the upper surface of said main frame.

16. The working machine according to claim 15, further comprising a floor plate disposed above the bottom plate with a space formed between the floor plate and the bottom plate, wherein said projecting portion of the fuel tank is fitted in a gap formed between the floor plate and the slant portion of the main frame.

17. The working machine according to claim 14, further comprising a floor plate disposed above said bottom plate, with a space formed between said floor plate and said bottom plate, and wherein said projecting portion is fitted in a gap formed between said floor plate and an upper surface of said main frame to fix said fuel tank having said projecting portion.

18. A working machine comprising:

a main frame which constitutes a machine body of said working machine, said main frame having a bottom plate and a longitudinal wall formed on an upper side of said bottom plate;

a fuel tank mounted on the upper side of said bottom plate so as to contact said longitudinal wall, said fuel tank having a hollow projecting portion formed in an upper end portion of said fuel tank and the hollow projecting portion projecting beyond said longitudinal wall; and a floor plate disposed above said longitudinal wall, with a gap formed between said floor plate and an upper surface of said longitudinal wall, and wherein said projecting portion is fitted in said gap to fix said fuel tank.

* * * * *